United States Patent
Patzer et al.

(10) Patent No.: US 6,875,148 B2
(45) Date of Patent: Apr. 5, 2005

(54) DIFFERENTIAL FOR THE AXLE DRIVE OF A MOTOR VEHICLE AND METHOD OF MAKING SAME

(75) Inventors: Jürgen Patzer, Lenningen (DE); Peter Meffert, Tiefenbronn (DE); Heinrich Schwarz, Tiefenbronn (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/169,374

(22) PCT Filed: Oct. 10, 2001

(86) PCT No.: PCT/EP01/11693

§ 371 (c)(1),
(2), (4) Date: Jul. 1, 2002

(87) PCT Pub. No.: WO02/36991

PCT Pub. Date: May 10, 2002

(65) Prior Publication Data

US 2003/0166432 A1 Sep. 4, 2003

(30) Foreign Application Priority Data

Nov. 2, 2000 (DE) .......................................... 100 54 237

(51) Int. Cl.⁷ .............................................. F16H 48/06
(52) U.S. Cl. ..................................................... 475/230
(58) Field of Search .............................. 475/230, 246, 475/247

(56) References Cited

U.S. PATENT DOCUMENTS

| | | | | |
|---|---|---|---|---|
| 1,115,536 A | * | 11/1914 | Hinkley | 475/230 |
| 1,290,111 A | * | 1/1919 | Deckert | 475/223 |
| 1,332,535 A | * | 3/1920 | Baker | 475/230 |
| 1,421,834 A | | 7/1922 | Ross | |
| 3,427,900 A | | 2/1969 | Walker | |
| 4,084,450 A | * | 4/1978 | Conroy | 475/230 |
| 3,779,102 A | | 12/1983 | Pfarrwaller | |
| 5,323,666 A | | 6/1994 | Etherington et al. | |
| 5,480,360 A | | 1/1996 | Patzer et al. | |
| 6,425,840 B1 | * | 7/2002 | Johansson | 475/247 |

FOREIGN PATENT DOCUMENTS

| | | |
|---|---|---|
| BE | 384 323 | 11/1931 |
| CH | 94132 | 4/1922 |
| DE | 2 202 859 | 10/1972 |
| GB | 922004 | 3/1963 |

* cited by examiner

*Primary Examiner*—Dirk Wright
(74) *Attorney, Agent, or Firm*—Crowell & Moring LLP

(57) ABSTRACT

A differential for the axle drive of a motor vehicle, having a differential case which carries a driving wheel, is disposed in a transmission case and in which an axle bolt is disposed which carries differential gears, the differential gears meshing which axle shaft gears arranged on axle drive shafts. These gears are constructed as bevel gears. It is suggested that a first joint flange carrying a first axle shaft gear is connected by way of a connecting rod with a second joint flange carrying a second axle shaft gear, the connecting rod being guided through an opening arranged in the axle bolt. By way of the connecting rod, the two joint flanges are connected with one another in the radial direction, so that their bearing is improved.

13 Claims, 4 Drawing Sheets

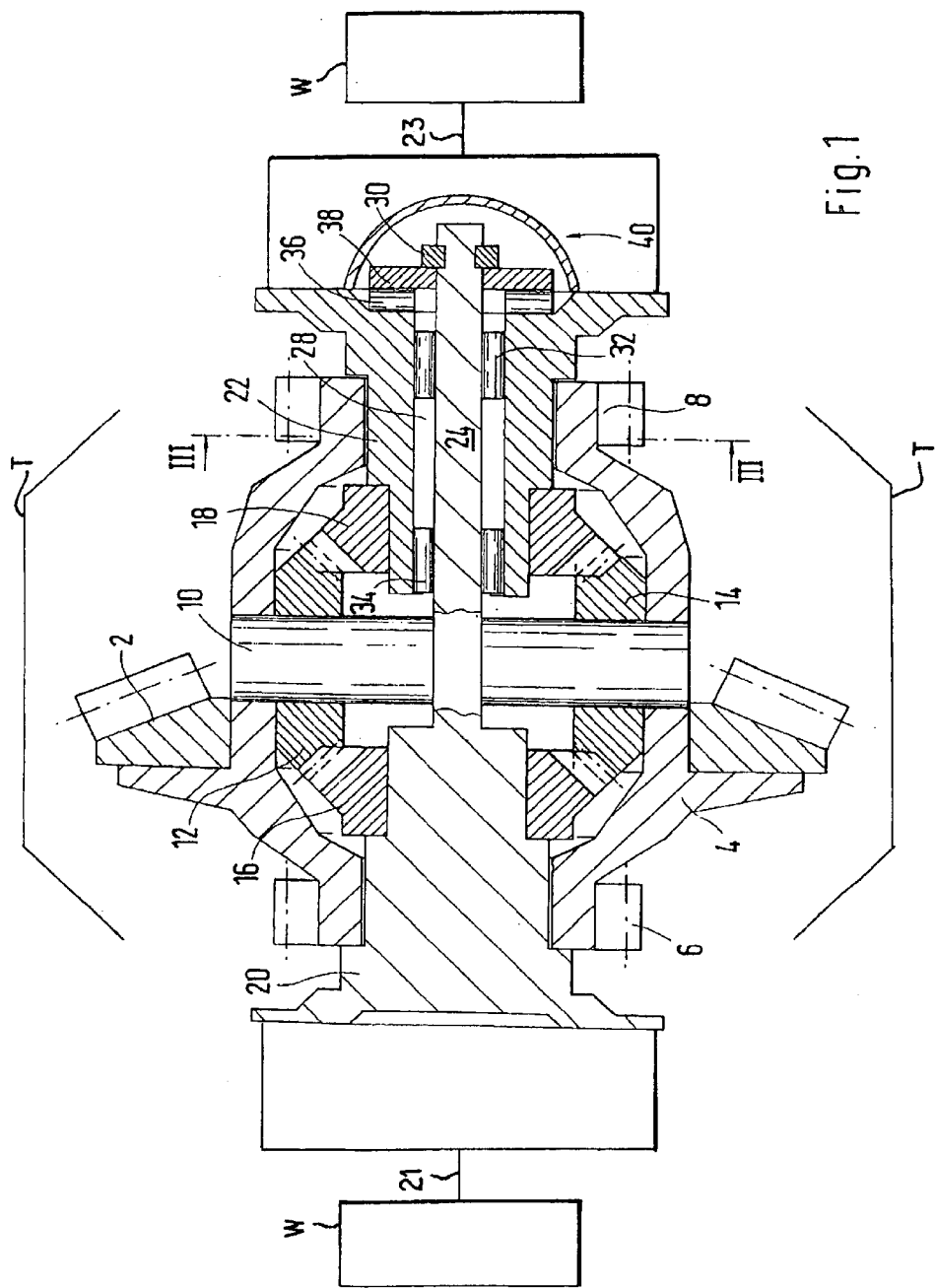

DIFFERENTIAL FOR THE AXLE DRIVE OF A MOTOR VEHICLE AND METHOD OF MAKING SAME

BACKGROUND AND SUMMARY OF THE INVENTION

The invention relates to a differential for a motor vehicle comprising a differential case which carries a driving wheel and is disposed in a transmission case, in the differential case an axle bolt being disposed which carries differential gears, the differential gears meshing with axle shaft gears arranged on axle drive shafts, and the gears being constructed as bevel gears.

From German Patent Document DE 43 13 322 A1 and corresponding U.S. Pat. No. 5,480,360, it is, for example, known to dispose the axle shaft bevel gears in a cage so that the forces acting in the direction of the axle drive shafts can be absorbed. As a result, the differential case can be relieved from these forces and can therefore have a correspondingly smaller dimension.

It is an object of the invention to provide an improved differential for the axle drive of a motor vehicle which, despite its light-weight construction, is distinguished by a quiet and low-wear operation.

This object is achieved by a first joint flange carrying a first of the axle shaft gears connected by way of a connecting rod with a second joint flange carrying a second of the axle shaft gears, the connecting rod being guided through an opening arranged in the axle bolt. By way of the connecting rod, the axial flux of force generated by the axle shaft bevel gears is absorbed or closed. A differential cage is therefore no longer required. By way of the connecting rod, the joint flanges are also connected in the radial direction, so that the connected, more precise bearing guidance results in a quiet operation of the axle differential.

Advantageous developments and further developments of the invention are indicated in the preferred embodiments.

In a first advantageous embodiment, the connecting rod is connected in one piece with a first joint flange. As a result of the fact that the second joint flange is guided on the connecting rod by way of radial bearings, a possible tilting movement of the two joint flanges is further reduced. This measure also contributes to the noise reduction and to a wear-free operation of the axle differential.

An axial bearing arranged at the end of the second joint flange supports a low-friction and low-noise relative movement between the joint flange and the connecting rod during the cornering of the motor vehicle.

In a second advantageous embodiment, both joint flanges are provided with a cylindrical opening through which the connecting rod is guided, a securing element being in each case arranged at the end of the joint flanges on the connecting rod, for absorbing the axial force generated because of the conical gearing.

In the following, the invention will be explained as an example by way of schematic drawings.

BRIEF DESCRIPTION OF THE DRAWINGS

FIG. 1 shows a schematic overall representation of an axle differential in a first embodiment;

DETAILED DESCRIPTION OF THE DRAWINGS

Figure 3:
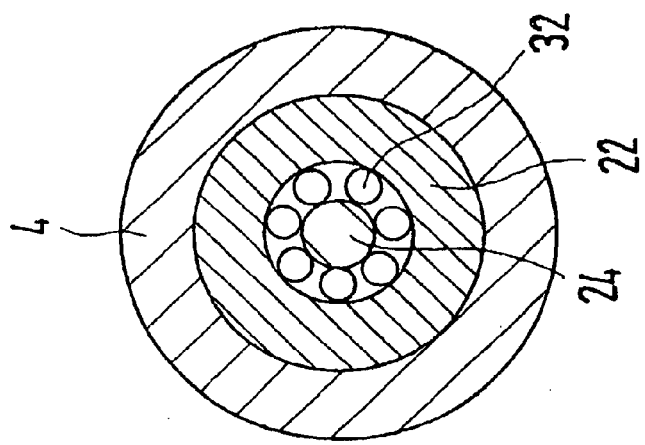
FIG. 3 shows a sectional view along Line III—III in FIG. 1.
Figure 2:
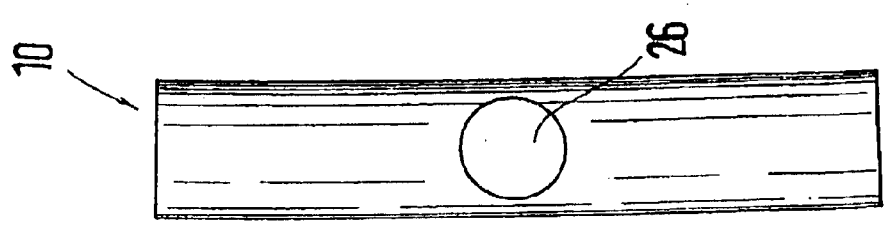
FIG. 2 shows a view of an axle bolt.

A differential for the axle drive of a motor vehicle has a driving wheel which is constructed as a ring gear 2 and carries a differential case 4. The differential case 4 as well as a pinion (not shown) driving the ring gear 2 are disposed in a transmission case T (see bearings 6 and 8).

An axle bolt 10, on which two differential bevel gears 12 and 14 are rotatably disposed, is arranged in the differential case. The two differential bevel gears 12, 14 mesh with two axle shaft bevel gears 16 and 18. The axle shaft bevel gears 16, 18, in turn, are each non-rotatably connected with a joint flange 20 and 22, to which axle drive shafts 21 and 23 are fastened which are connected with the vehicle wheels W.

The joint flange 20, in the following, called "first joint flange", has, in its axial extension, a connecting rod 24 which extends through an opening 26 arranged in the axle bolt 10 and a cylindrical opening 28 arranged in the joint flange 22, in the following called "second joint flange". The connecting rod receiving the second joint flange 22 is provided at its end with an axial securing element 30, which is constructed as a nut, a snap ring, a split pin or a similar device. The second joint flange 22 is rotatably disposed on the connecting rod 24 by means of two radial bearings 32 and 34, which are constructed as slide bearings or roller bearings, as well as by means of an axial bearing 36. The axial bearing 36 arranged at the end of the second joint flange 22 and also constructed as a slide bearing or roller bearing is axially supported by a butting disk 38 adapted to the diameter of the axial bearing 36. The butting disk 38, in turn, is axially supported by the securing element 30. The end of the connecting rod 24 provided with the axial bearing 36 is, in addition, sealed off by a protective cap 40.

Figure 4:
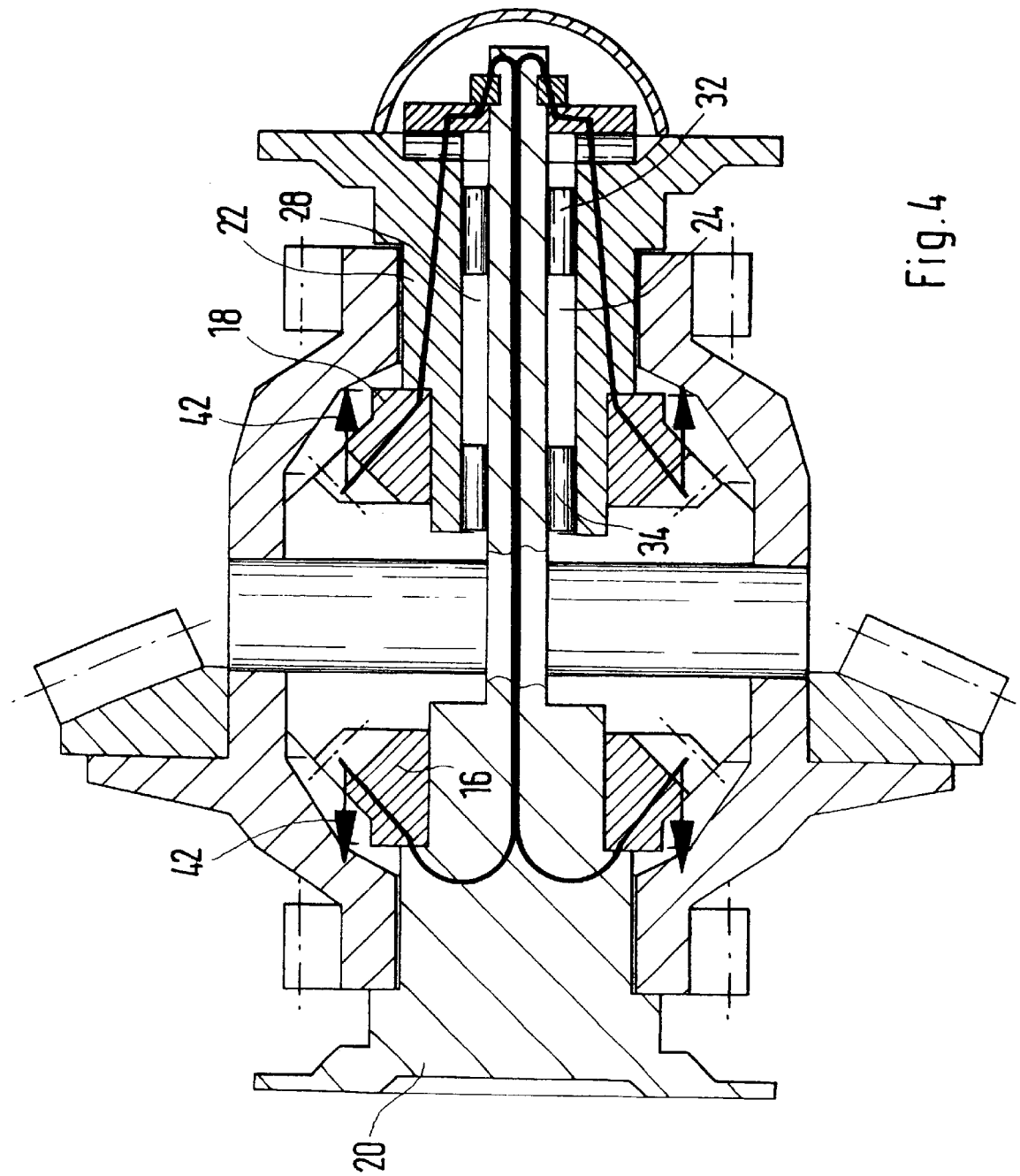
FIG. 4 shows a view of the axial flow of force of the axle shaft bevel gears.

As illustrated in FIG. 4, the flow of axial force 42 generated on the basis of the conical gearing of the differential gears 12, 14 with the axle shaft gears 16 and 18 is closed by means of the connecting rod 24, so that an additional axial supporting of the axle shaft bevel gears 16, 18 is not required. As a result of the fact that the two joint flanges 20, 22 are mutually connected by way of the connecting rod 24, their radial bearing is improved. Possible tilting motions of the joint flanges 20, 22 are prevented by the two radial bearings 32, 34 provided in the cylindrical opening 28 of the second joint flange 22.

Figure 5:
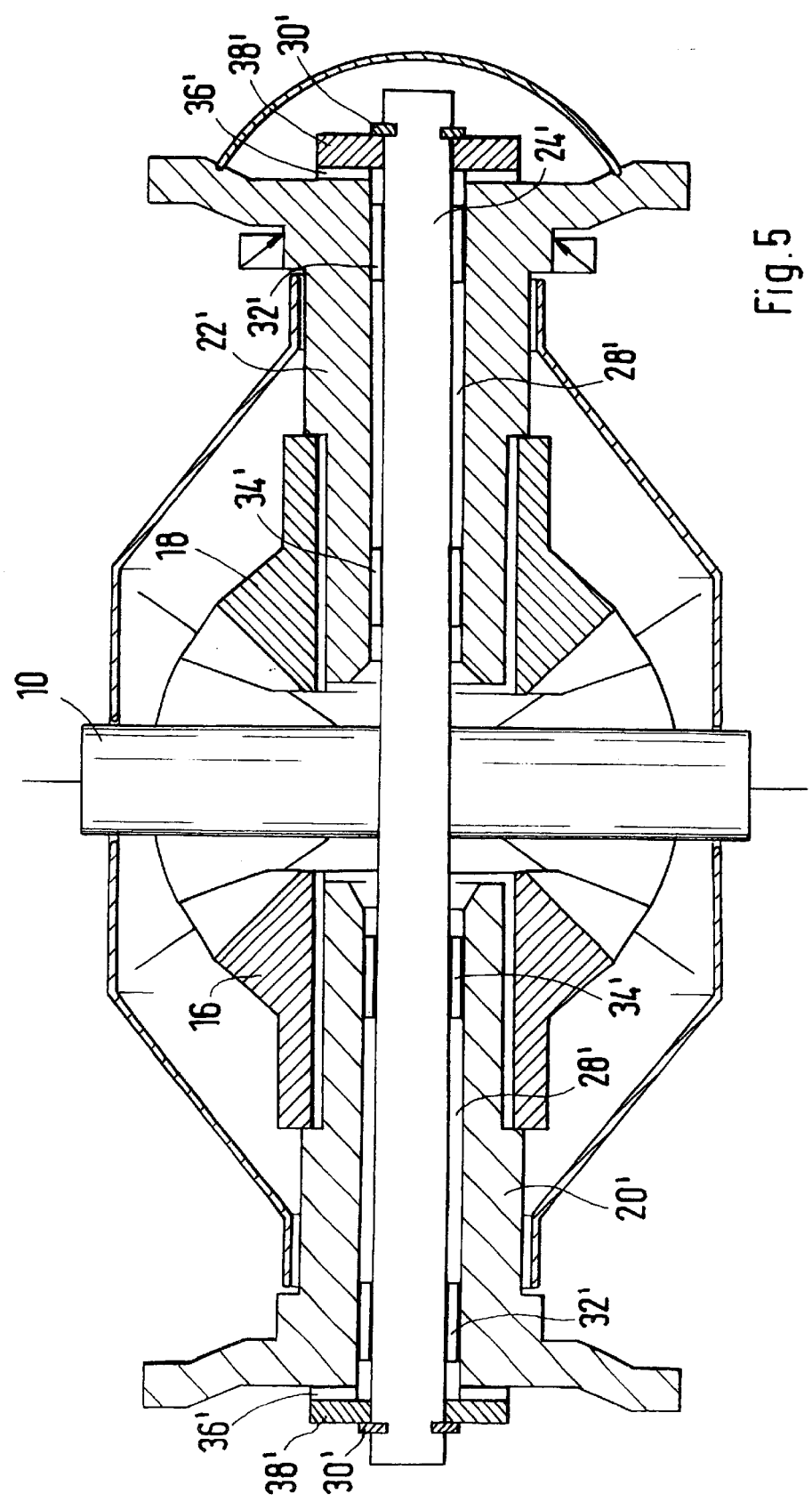
FIG. 5 shows a view of an axle differential in a second embodiment.

The second embodiment illustrated in FIG. 5 differs from the first embodiment in that the two joint flanges 20' and 22' have the same construction and are each provided with a cylindrical opening 28' through which a separately constructed connecting rod 24' is guided. The two joint flanges 20' and 22' are, in turn, rotatably disposed on the connecting rod 24' by way of two radial bearings 32' and 34' respectively as well as by axial bearings 36' in each case arranged at the end of the two joint flanges 20' and 22'. The two axial bearings 36' are, in turn, axially supported by one butting disk 38' respectively, the two butting disks 38' being axially supported by way of the securing element 30'. Also by means of this second embodiment of an axle differential, the advantageous effects are achieved which were described with respect to the first embodiment.

What is claimed is:

1. A differential for an axle drive of a motor vehicle, comprising:

differential case which carries a driving wheel, an axle bolt disposed in the differential case and carrying differential gears, and axle shaft gears arranged on axle joint flanges, the differential and axle shaft gears being constructed as bevel gears, wherein a first of said joint flange flanges carrying a first of the axle shaft gears is connected by way of a connecting rod with a second of said joint flanges carrying a second of the axle shaft gears, the connecting rod being guided through an opening arranged in the axle bolt, and wherein axle drive shafts connected with wheels of said motor vehicle are fastened to the joint flanges.

2. A differential according to claim 1, wherein one end of the connecting rod is guided through the second of said joint flanges provided with a cylindrical opening and is axially secured.

3. A differential for an axle drive of a motor vehicle, comprising a differential case which carries a driving wheel and is disposed in a transmission case, in the differential case an axle bolt being disposed which carries differential years, the differential meshing with axle shaft gears arranged on axle drive shafts, and the gears being constructed as bevel gears, wherein a first joint flange carrying a first of the axle shaft gears is connected by way of a connecting rod with a second joint flange carrying a second of the axle shaft gears, the connecting rod being guided through an opening arranged in the axle bolt, and wherein the second joint flange is rotatably disposed on the connecting rod by way of radial bearings.

4. A differential for an axle drive of a motor vehicle, comprising a differential case which carries a driving wheel and is disposed in a transmission case, in the differential case an axle bolt being disposed which carries differential gears, the differential meshing with axle shaft gears arranged on axle drive shafts, and the gears being constructed as bevel sears, wherein a first joint flange carrying a first of the axle shaft gears is connected by way of a connecting rod with a second joint flange carrying a second of the axle shaft gears, the connecting rod being guided through an opening arranged in the axle bolt, wherein one end of the connecting rod is guided through the second joint flange provided with a cylindrical opening and is axially secured, and wherein the second joint flange is rotatably disposed on the connecting rod by way of radial bearings.

5. A differential according to claim 1, wherein an axial bearing is arranged between an end of the second of said joint flanges and a disk axially secured at an end of the connecting rod.

6. A differential according to claim 2, wherein an axial bearing is arranged between an end of the second of said joint flanges and a disk axially secured at an end of the connecting rod.

7. A differential according to claim 3, wherein an axial bearing is arranged between an end of the second joint flange and a disk axially secured at an end of the connecting rod.

8. A differential according to claim 1, wherein each of the joint flanges has a cylindrical opening through which the connecting rod extends, for absorbing axial forces generated by the axle shaft gears, a securing element being arranged at an end of each of the joint flanges on the connecting rod.

9. A motor vehicle differential assembly for a motor vehicle, comprising:

a differential case carrying a driving wheel, a transmission case in which the differential case is disposed, an axle bolt being disposed in the differential case and carrying differential gears, a first axle shaft gear and a second axle shaft gear arranged on corresponding joint flanges and meshing with the differential gears, the axle shaft gears and differential gears being constructed as bevel gears, a first of said joint flanges carrying the first axle shaft gear, a second of said joint flanges carrying the second axle shaft gear, and a connecting element which connects the joint flanges in order to absorb or close an axial flux of force generated by the axle shaft gears, wherein axle drive shafts connected with wheels of said motor vehicle are fastened to the joint flanges.

10. A motor vehicle differential assembly according to claim 8, wherein the connecting element is a connecting rod guided through an opening in the axle bolt.

11. A motor vehicle differential assembly according to claim 9, wherein the connecting element is axially secured.

12. A motor vehicle differential according to claim 11, wherein the connecting element is guided through the second of said joint flanges.

13. A method of making a differential for an axle drive of a motor vehicle, comprising:

disposing a differential case carrying a driving wheel in a transmission case, disposing an axle bolt carrying differential gears in the differential case, arranging a first axle shaft gear and a second axle shaft gear on corresponding axle drive shafts so that the axle shaft gears mesh with the differential gears, the gears being constructed as bevel gears, and connecting a first joint flange carrying the first axle shaft gear by a connecting rod with a second joint flange carrying the second axle shaft gear, the connecting rod being guided through the axle bolt, wherein the second joint flange is rotatably disposed on the connecting rod by way of radial bearings.

* * * * *